Patented Sept. 27, 1949

2,482,923

UNITED STATES PATENT OFFICE 2,482,923

SOLDERING FLUX

James P. A. McCoy, Milwaukee, Wis., assignor to Allis-Chalmers Manufacturing Company, Milwaukee, Wis., a corporation of Delaware No Drawing. Application April 28, 1945, Serial No. 590,949

17 Claims. (Cl. 148—23)

This invention relates generally to improvements in the art of soldering, and relates particularly to the provision of an improved soldering flux.

In the fabrication of metal articles in which union of the parts is effected by soldering or the like, it is customary, prior to the soldering operation, to coat the parts to be joined with a material which will not only aid in the adherence of the solder but also remove from the surface of the metal any oxides or other impurities which can interfere with the strength of the soldering joint. The coating material commonly used is referred to as flux, and in soldering operations in manufacture various compositions of corrosive and noncorrosive fluxes have heretofore been proposed. It is desirable, particularly in the manufacture of electrical equipment, to avoid a corrosive flux that can damage the conductors and the electrical insulation, and to employ instead a noncorrosive flux.

Heretofore in the preparation of a noncorrosive flux, the practice has been to use a solution of rosin or cherry tree gum in alcohol. Fluxes of this character, however, have not proven entirely satisfactory for a number of reasons, one of them being that they are chemically slow acting. Moreover, the alcohol solvent of the flux has a low boiling point when compared with the melting point of solder. Upon the application of soldering heat, the alcohol solvent is rapidly driven off and the remaining rosin or gum residue is carbonized. The carbonized rosin which remains on the metal interferes with the adherence of the solder and produces an inferior joint. Then too, alcohol fluxes are unsatisfactory as solvents for removing (prior to soldering) grease and oil impurities from the surfaces of the metal.

It is therefore an object of the present invention to provide an improved noncorrosive soldering flux which obviates any or all of the difficulties heretofore encountered.

Another object of the present invention is to provide an improved noncorrosive and nonhygroscopic flux for soldering or metal coating operations which flux may be subjected to high temperatures without the occurrence of vaporization and consequent carbonization.

Another object of this invention is to provide an improved flux which has an effective solvent action upon greases and oils, thereby aiding in cleansing the surfaces of the metal prior to soldering.

Another object of my present invention is to provide an improved noncorrosive and nonhygroscopic flux which can be readily manufactured, which can be stored and handled in convenient form, which can be merchandized at low cost, which can be readily applied as a coating to the parts to be joined, and which is moreover highly effective in preparing metal surfaces for solder or the like.

An additional object of this invention is to provide an improved soldering flux comprising a fluxing material and a phthalic acid ester.

A further object of this invention is to provide an improved soldering flux comprising a natural gum or resinous material and at least one phthalic acid ester selected from the group comprising dibutyl phthalate, diamyl phthalate, diethyl phthalate, dimethyl phthalate, and dipropyl phthalate, in sufficient quantities to render said natural gum or resinous material workable.

One particular composition embodying the present invention which has given highly desirable results consists of a mixture of the following ingredients in substantially the indicated proportions by weight.

| | Parts |
|---|---|
| Water white rosin | 2 |
| Dibutyl phthalate | 1 |

However, the ingredients may be varied within any limits such as would result in the formation of a paste or liquid capable of being conveniently worked and applied to the surfaces of the parts to be soldered or otherwise metal coated, dependent upon the heat necessary to effect the soldering operation in a particular instance, without materially affecting the desired characteristics of the final compound. It should be understood, however, that the amount of dibutyl phthalate necessary to prevent carbonization increases proportionately to the amount of soldering heat necessary in a particular instance. Furthermore, any suitable fluxing material such as cherry tree gum or other natural resinous material completely soluble in a phthalic acid ester and preferably of the type having a high acid number as when containing a high percentage of abietic acid. A pure abietic acid alone or in combination with such resinous material may be utilized in place of the water white rosin without materially affecting the desired characteristics of the product.

As to the use of dibutyl phthalate in my improved compound, other phthalic acid esters selected from particular groups or combinations thereof, and more especially one selected from a group possessing a high boiling point, may be utilized. The selection of a proper phthalic acid ester is dependent upon the degree of heat to be applied in the soldering operation, with the derivatives possessing higher boiling points being more suitable for higher temperature soldering operations. The desired characteristics of the final compound may be obtained by utilizing a dialkyl phthalic acid ester having an alkyl radical of not more than five carbon atoms selected from one of the following groups or a combination thereof:

Dibutyl phthalate  Dimethyl phthalate
Diamyl phthalate  Dipropyl phthalate
Diethyl phthalate In actual practice the improved flux is prepared in the following manner. The rosin or other fluxing material is introduced into a steam heated kettle together with the dibutyl phthalate in the amounts of 100 pounds of rosin to 50 pounds of dibutyl phthalate.

Although dibutyl phthalate is here specified as a preferred ingredient, any one of the phthalates hereinbefore recited, namely dimethyl, diethyl, dipropyl, or diamyl phthalate may be substituted for or admixed to dibutyl phthalate in the above composition, the selected phthalate or phthalate mixture being so proportioned that the resultant flux will comprise substantially the proportion of two parts of natural resin per one part of the selected phthalate or phthalate mixture.

The mixture of resin and dibutyl phthalate is then heated to a temperature of approximately 125° C. until the mixture is melted, after which it is cooled to room temperature and thinned, if necessary, with added dibutyl phthalate to the desired consistency; i. e., a specific gravity of 1.062 to 1.067 at 60° F. (15° C.) has been found to be entirely practical. After thinning, the product is thoroughly stirred and filtered through a cheese cloth or strainer into suitable containers. The flux product is then ready for use, consignment to stock or shipment.

The dibutyl phthalate used in the improved flux compound possesses a boiling point of 335° C. and therefore remains in situation at soldering temperatures, preventing carbonization of the flux. It is, moreover, a grease solvent of low surface tension, thereby serving to cleanse the surfaces of the metal by dissolving any grease or oil which may be deposited on such surfaces. It may be purchased as a commercial item on the open market.

Soldering fluxes compounded in accordance with the foregoing description have proven extremely satisfactory in actual commercial use on electrical equipment. The joints formed through the use of the improved flux have withstood the most rigid tests as to durability, and considerable savings have been effected by elimination of damage due to the corrosive action of many fluxes heretofore used. Fluxes produced in accordance with the present invention are noncorrosive and nonhygroscopic, may be readily stored and handled without deterioration, and may be easily applied to provide an effective surface for the solder or other metal coating.

While my improved flux has been particularly described as especially useful in the fabrication of electrical equipment, it is not desired or intended to limit the present invention thereto as the flux may obviously be used in connection with other types of equipment, especially where a noncorrosive flux is desirable.

Although but one example of the composition of the present invention has been described herein, it is likewise not intended to limit the invention thereto since various substitutes and modifications within the scope of the claims may occur to persons skilled in the art to which this invention pertains.

It is claimed and desired to secure by Letters Patent:

1. A soldering flux consisting of rosin and dibutyl phthalate in approximately the proportion of two parts of rosin per part of dibutyl phthalate.

2. A soldering flux paste consisting of cherry tree gum and dibutyl phthalate in approximately the proportion of two parts of cherry tree gum per part of dibutyl phthalate.

3. A soldering flux paste consisting of cherry tree gum and a phthalic acid ester selected from the group consisting of dibutyl phthalate, diamyl phthalate, diethyl phthalate, dimethyl phthalate, and dipropyl phthalate.

4. A soldering flux paste consisting of rosin and a phthalic acid ester selected from the group consisting of dibutyl phthalate, diamyl phthalate, diethyl phthalate, dimethyl phthalate and dipropyl phthalate.

5. A soldering flux paste consisting of rosin and dibutyl phthalate.

6. A soldering flux paste consisting of rosin and diamyl phthalate.

7. A soldering flux paste consisting of rosin and diethyl phthalate.

8. A soldering flux paste consisting of dibutyl phthalate and a natural gum resin completely soluble in the said phthalate.

9. A soldering flux paste consisting of diamyl phthalate and a natural gum resin completely soluble in a phthalic acid ester.

10. A soldering flux paste consisting of diethyl phthalate and a natural gum resin completely soluble in a phthalic acid ester.

11. A soldering flux paste consisting of dialkyl phthalic acid ester having an alkyl radical of not more than five carbon atoms and a natural gum resin selected from the group consisting of rosin and cherry tree gum.

12. A soldering flux paste consisting of a natural gum resin and a phthalic acid ester selected from the group consisting of dimethyl phthalate, diethyl phthalate, dipropyl phthalate, dibutyl phthalate, and diamyl phthalate, said resin being completely soluble in the said ester.

13. A soldering flux paste consisting of a natural gum resin and at least one phthalic acid ester of the group consisting of dimethyl phthalate, diethyl phthalate, dipropyl phthalate, dibutyl phthalate, and diamyl phthalate, said resin being completely soluble in the said ester.

14. A soldering flux paste consisting of rosin and dibutyl phthalate, said rosin being completely soluble in the said phthalate, and the said phthalate being in an amount sufficient to produce a final product having a specific gravity within the range of 1.062 to 1.067 at 60° F.

15. A soldering flux paste consisting of a natural gum resin and a phthalic acid ester selected from the group consisting of dimethyl phthalate, diethyl phthalate, dipropyl phthalate, dibutyl phthalate, and diamyl phthalate, said resin being completely soluble in the said ester and being in the proportion of substantially two parts of resin to one part of ester both by weight.

16. A soldering flux paste consisting of abietic acid and a phthalic acid ester selected from the group consisting of dimethyl phthalate, diethyl phthalate, dipropyl phthalate, dibutyl phthalate, and diamyl phthalate.

17. A soldering flux paste consisting of a phthalic acid ester selected from the group consisting of dimethyl phthalate, diethyl phthalate, dipropyl phthalate, dibutyl phthalate and diamyl phthalate, and a natural gum resin selected from the group consisting of rosin and cherry tree gum.

JAMES P. A. McCOY.

REFERENCES CITED

The following references are of record in the file of this patent:

UNITED STATES PATENTS

| Number | Name | Date |
| --- | --- | --- |
| 1,859,651 | Bowers | May 24, 1932 |
| 2,029,288 | Bray | Feb. 4, 1936 |
| 2,228,352 | Hopfield | Jan. 14, 1941 |
| 2,250,940 | Zahn | July 29, 1941 |
| 2,313,736 | Dashner | Mar. 16, 1943 |

FOREIGN PATENTS

| Number | Country | Date |
| --- | --- | --- |
| 482,510 | Great Britain | Mar. 29, 1938 |